(12) United States Patent
Wang (10) Patent No.: US 7,708,215 B2
(45) Date of Patent: May 4, 2010

(54) FOOD PROCESSOR COVER

(76) Inventor: Dong-lei Wang, No. 1 Jinfeng Road, Tangjiawan Town, Xiangzhou District, Zhuhai City, Guangdong Province (CN)

( * ) Notice: Subject to any disclaimer, the term of this patent is extended or adjusted under 35 U.S.C. 154(b) by 211 days.

(21) Appl. No.: 11/935,041

(22) Filed: Nov. 5, 2007

(65) Prior Publication Data
US 2008/0111011 A1 May 15, 2008

(30) Foreign Application Priority Data
Nov. 14, 2006 (CN) .................. 2006 2 0067659 U (51) Int. Cl.
*B02C 25/00* (2006.01)

(52) U.S. Cl. .................................. 241/37.5; 241/282.1

(58) Field of Classification Search .................. 241/36, 241/37.5, 92, 282.1, 282.2
See application file for complete search history.

(56) References Cited

U.S. PATENT DOCUMENTS 5,037,033 A * 8/1991 Stottmann et al. .......... 241/37.5

* cited by examiner

*Primary Examiner*—Mark Rosenbaum
(74) *Attorney, Agent, or Firm*—Allen, Dyer, Doppelt, Milbrath & Gilchrist, P.A.

(57) ABSTRACT

The present invention relates to a food processor and a cover thereof. The food processor cover comprises a feed tube which extends upwardly from an upper cover surface, a safety rod assembly, a locking device, and a feed tube lid assembly pivotally mounted on said feed tube; said feed tube lid assembly includes a safety food entrance. By enlarging the size of feed tubes and food entrances, larger sized food is able to go through in larger quantities.

10 Claims, 6 Drawing Sheets

FOOD PROCESSOR COVER

CROSS-REFERENCE TO RELATED APPLICATION

The present invention claims priority of CN Patent Application No. 200620067659.X filed on Nov. 14, 2006, the contents of which are incorporated herein by reference for all purposes.

FIELD OF THE INVENTION

The present invention relates to a food processor, and in particular to a cover for the food processor which can handle larger sized food in larger quantities.

BACKGROUND OF THE INVENTION

Normally a food processor comprises a cover with a feed tube extending from an upper surface, a food pusher which moves in the feed tube, a working bowl, which is disposed under the cover and used in combination with the cover, and a base housing to support the working bowl. A driving device is disposed inside the base housing, and a blade tool is mounted on the driving device and positioned in the food processor working bowl. An entrance for food is disposed at the top of the feed tube by which food can be pushed by the food pusher into the working bowl to be tightly compressed onto the blade of blade tool so as to be processed easily. Usually, food processors are equipped with some spare blade tools to meet different food processing requirements. After being processed, the food drops down from the working blade tool into the working bowl. To avoid injuries caused by users putting their hands through the feed tube into the working bowl while the machine tool is in operation, Underwriter Laboratories Inc. (UL) made the following safety regulations on the feed tube size of the food processor cover: the average of the major and minor axes should be less than 2.5 inches (63.5 mm) as well as the major axis should be less than 3 inches (76.2 mm), and the distance from the top surface of the feed tube to the surface of the machine tool should be more than 4 inches (101.6 mm). Furthermore, Underwriter Laboratories Inc. (UL) regulated that if the average of the major and minor axes is less than 2 inches (50.8 mm), the distance from the top surface of the feed tube to the surface of the machine tool should be more than 3.5 inches (88.9 mm).

Cover feed tubes made in accordance with the above mentioned regulations have their limitations, i.e. only relatively small and long food is able to be pushed into food processor to be processed. For example, most potatoes are approximately 50 mm in diameter, which results in that only one potato can go through the feed tube at a time. Moreover, when the food is too large to go through the feed tube, because of the size limitations stated in the safety regulations above, it has to be cut down into small pieces to fit into the feed tube and accordingly, food processing procedures are increased and also inconvenient. At present, no better solution is available to solve this problem.

SUMMARY OF THE INVENTION

The present invention is to solve the problems of prior art food processors due to small feed tubes by enlarging the size of feed tubes and food entrances to enable larger sized food to go through in larger quantities. Moreover, when the feed tube is fully opened, i.e. when a user's hand can easily reach the blade tool, the motor cannot be actuated by force which ensures the safety of users according to the safety regulations. Accordingly, when actuating the motor, the enlarged food entrance is fully sealed and conforms to the above safety regulations.

The goal of the present invention is achieved by the following technical scheme:

A food processor cover comprising:

an upper cover surface, a feed tube which extends upwardly from the upper cover surface, a feed tube lid assembly pivotally mounted on said feed tube, a safety rod assembly disposed on the outside of the feed tube, said safety rod assembly including an operating rod and a rod spring, and a locking device disposed on an upper end of said safety rod assembly;

wherein said feed tube lid assembly includes a safety food entrance defined by a major axis and a minor axis, with an average of the major and minor axes being less than 2.5 inches (63.5 mm) and the major axis being less than 3 inches (76.2 mm);

whereby when the feed tube lid assembly is in a closed state, it is locked with the locking device so as to compress down the operating rod; and when the feed tube lid assembly is in an open state, the operating rod is urged to reset by means of the rod spring.

Wherein said feed tube lid assembly includes a feed tube lid pivotally mounted on the feed tube, and a movable sleeve; wherein said feed tube lid includes a through hole at an upper end thereof for receiving the movable sleeve inside the feed tube lid and enabling axial movements of the movable sleeve therein; and wherein each end of the movable sleeve includes a limiting device, and the top of said movable sleeve forms the safety food entrance.

Wherein said limiting device includes an upper limit ring and a lower limit ring respectively shaped in oval; wherein said upper limit ring and lower limit ring are integrally fixed on said movable sleeve; wherein the outer dimensions of the upper and lower limit rings are slightly larger than that of the through hole of the feed tube lid; and wherein at least one protruding member is disposed at a bottom surface of the lower limit ring.

Wherein the periphery of said feed tube lid extends downwardly forming a lid brim with dimensions larger than that of the feed tube; wherein an upward edge of the through hole of the feed tube lid forms an upward neck; and wherein the feed tube lid is pivotally connected to the feed tube.

Wherein said lid brim has a protruding member positioned to correspond with the operating rod, wherein a square concave recess is disposed in the lid brim above said protruding member; and whereby when the feed tube lid covers the feed tube, the protruding member of the feed tube lid presses down the operating rod, meanwhile the locking device is locked within said square concave recess.

Wherein the cross sections of the feed tube lid and the through hole are both in similar shapes selected from the group consisting of an oval and a circle, and said movable sleeve has a tubular structure formed by a thin wall whose cross section is in a shape selected from the group consisting of an oval and a circle.

Wherein said safety rod assembly includes a boss for holding the operating rod and a rod upper end; wherein said boss is integrated on an outside of the feet tube; and wherein said rod spring is mounted on the operating rod which is disposed inside the boss, and the rod upper end is positioned at the top end of the boss, so that said operating rod can move up and down inside the boss in the direction of the cover central axis.

Wherein a lower part of the operating rod is formed into a cylinder onto which said rod spring is mounted so that the operating rod can be urged to reset automatically without external forces.

Wherein said rod upper end is fixed on the top end of the boss forming a sealed cavity within the boss, whereby the operating rod is restricted to move within the sealed cavity of the boss.

Wherein said feed tube and the boss extend upwardly in the direction of the cover central axis; and wherein the cross section of said feed tube is in a shape selected from the group consisting of an oval and a circle.

Wherein said locking device includes: a press button which locks with the rod upper end by use of two lock pins which are disposed under the right and left sides of the press button; a press button spring disposed under the press button by which the press button can move relatively inside the boss in the direction vertically to the cover central axis; and wherein when the feed tube lid covers the feed tube, the press button is locked into the square concave recess formed in the feed tube.

A food processor comprises: said food processor cover, a rotating blade tool including a rotating shaft, a working bowl disposed under the cover and to be used in combination with the cover, and a base housing to support the working bowl including a driving device therein with a shaft; wherein the rotating shaft of the rotating blade tool is connected with the shaft of the driving device, which is disposed under the feed tube inside the working bowl; and wherein when the feed tube lid covers the feed tube, the operating rod is pressed down to actuate the driving device.

The present invention has following advantages: when it comes to small sized food, the food can be put through from the safety food entrance from the movable sleeve, an additional food pusher is used inside the movable sleeve to push and compress on food in the working state; when it comes to larger sized food, open the feed tube lid and pull out the movable sleeve to let the food in and meanwhile, the movable sleeve is used as a food pusher to push and compress on food within the feed tube. Therefore, the precondition for actuating food processor motor is that the feed tube is fully covered by the feed tube lid. The size of the movable sleeve conforms to the safety regulations mentioned above to ensure the user's safety, meanwhile, the size of feed tube is enlarged. The enlargement of feed tube size results in that the food processor cover has less restrictions on food size; while adopting safety rod assembly and feed tube lid assembly, the safety regulations are obeyed when the enlarged feed tube lid is opened and also when the food processor is in operation; in addition, large sized food can be processed by said food processor cover with less restrictions on food size and the number of food processing procedures is reduced which adds utilities to the invention.

BRIEF DESCRIPTION OF THE DRAWINGS

Further features and advantages of the food processor cover of the present invention will become apparent from the following detailed description, in combination with the appended drawings, in which.

DETAILED DESCRIPTION OF THE PREFERRED EMBODIMENTS

As shown in FIGS. 1 to 7, the food processor cover 01, according to the present invention, comprises an upper cover surface 01A, a feed tube 07, which extends upwardly from the upper cover surface 01A, and a boss 02 for holding an operating rod. The feed tube 07 and the boss 02 extend upwardly in a direction parallel to the cover central axis 06. The cross section of the feed tube 07 is shaped similar to an oval of which the major axis is between 100-150 mm and minor axis is between 50-100 mm to allow larger sized food to go through the feed tube 07 in larger quantities. Alternatively, the cross section of this feed tube 07 may be circular in shape.

A feed tube lid 04 is disposed on the top end of the feed tube 07, the cross section of the feed tube lid 04 is similar to an oval and the periphery of the lid 04 extends downwardly forming a lid brim 04D of 4-12 mm high and 1.5-3.0 mm thick. The feed tube lid 04 has an oval hole extending through the center thereof with a major axis of 65-85 mm and a minor axis of 35-57 mm. A movable sleeve 05 is disposed inside the oval through hole of the feed tube lid 04, which can make relative movements inside the feed tube lid 04. The edge of the oval through hole of the feed tube lid 04 forms an upward neck 04A, which is 5-12 mm high and 1.5-3.0 mm thick.

As shown in FIGS. 2, 5, 6, and 7, the movable sleeve 05 has a tubular structure formed by an oval thin wall with a major axis of less than 76 mm and a minor axis of less than 51 mm. The outer dimension of the movable sleeve 05 is smaller than the dimension of the oval through hole of the feed tube lid 04. The movable sleeve 05 is disposed inside the feed tube lid 04, which can make relative movements inside the feed tube lid 04 in the direction parallel to the central axis 14 of the feed tube lid 04. An upper limit ring 05A and a lower limit ring 12 are disposed at the top and bottom of the movable sleeve 05 respectively. The shape of the limit rings 05A and 12 are oval, and the outer dimensions of the upper and lower limit rings 05A and 12 are larger than that of the through hole of the feed tube lid 04. The movable sleeve 05 is integrally fixed with the upper limit ring 05A and the lower limit ring 12 to make sure that the movable sleeve 05 can not be pulled out while moving. Therefore, no matter which positions the feed tube lid 04 is in, the movable sleeve 05 can make relative movements inside the feed tube lid 04 in the direction parallel to the central axis 14 of the feed tube lid 04.

Figure 2:
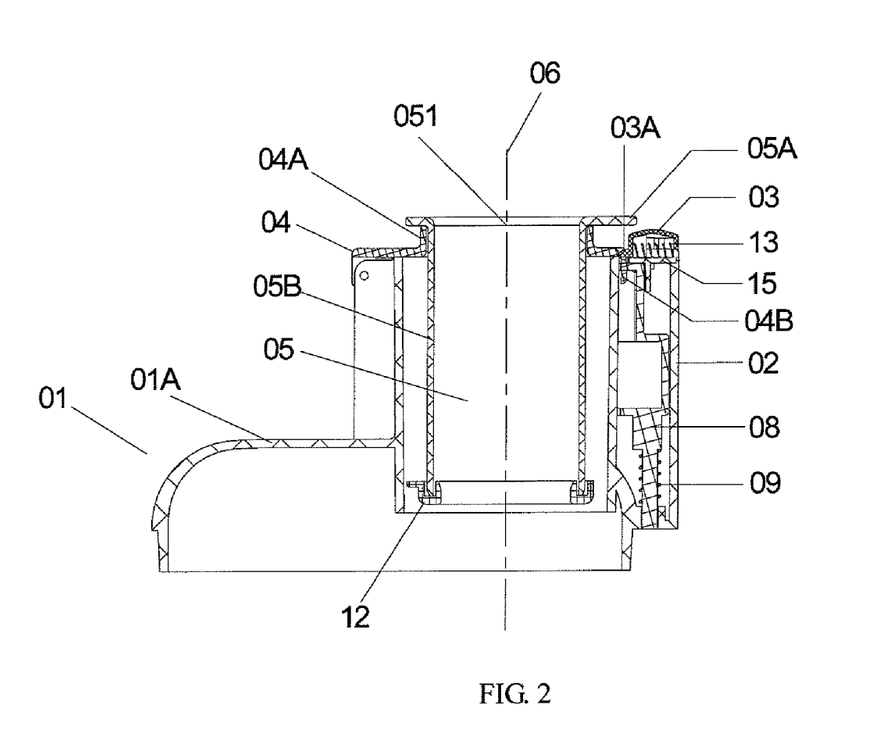
FIG. 2 is a cross-sectional view of the food processor cover as shown in FIG. 1.
Figure 3:
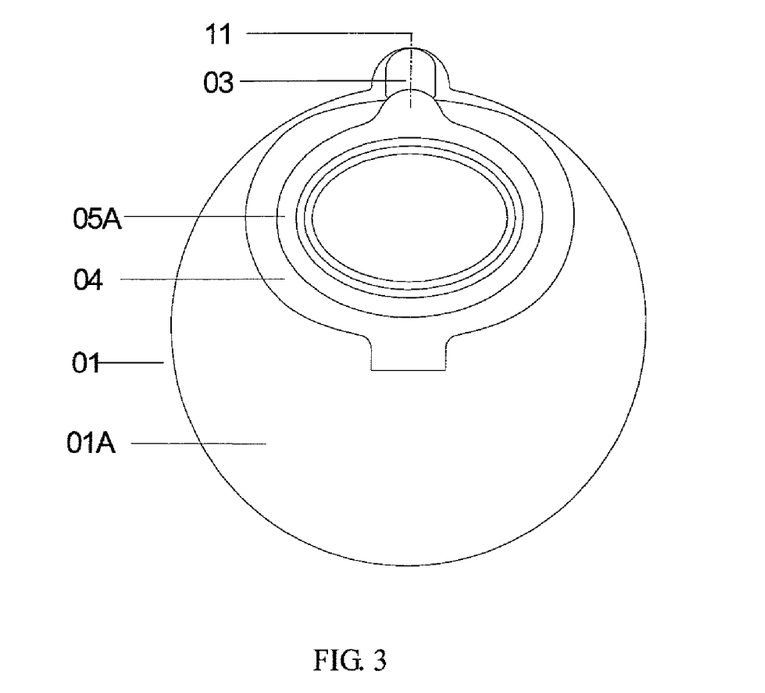
FIG. 3 is a top view of the food processor cover as shown in FIG. 1.
Figure 4:
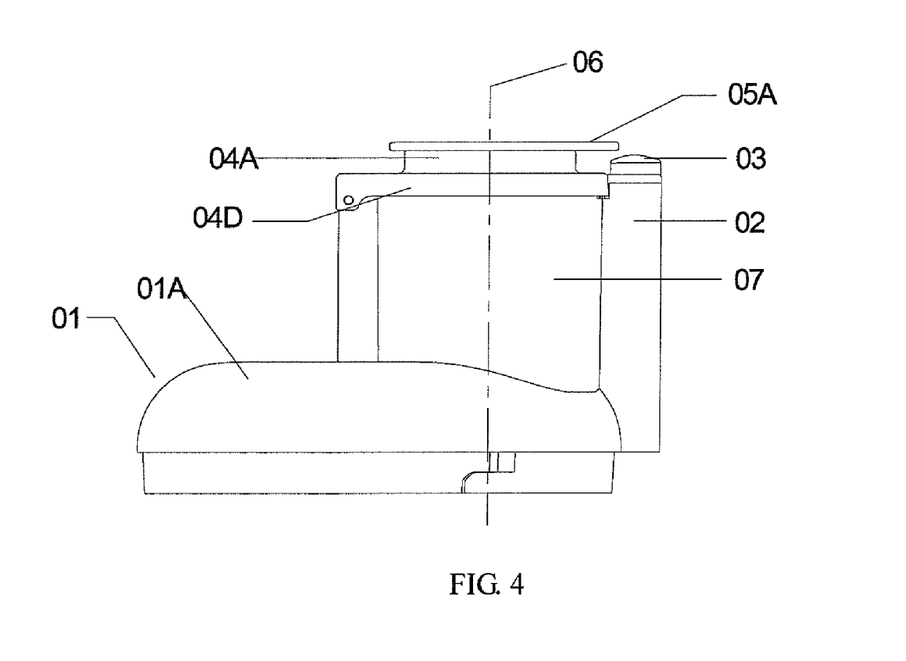
FIG. 4 is a side view of the food processor cover as shown in FIG. 1, wherein the feed tube lid is in a closed position and the movable sleeve is in a natural position.
Figure 5:
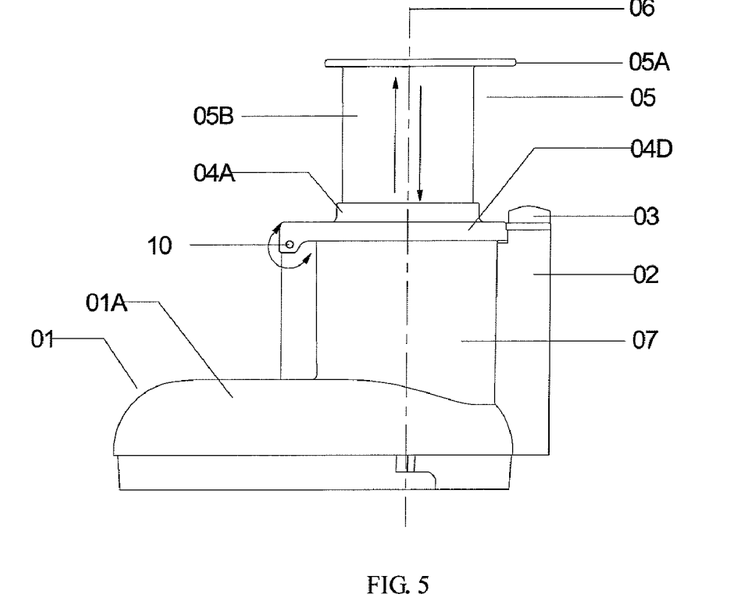
FIG. 5 is a side view of the food processor cover as shown in FIG. 1, wherein the feed tube lid is in the closed position and the movable sleeve is in a pull-out position.
Figure 6:
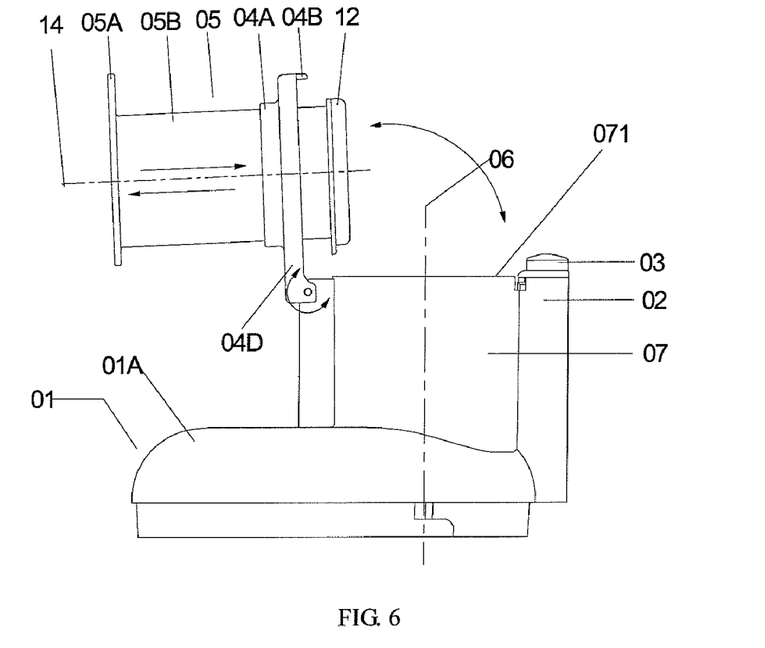
FIG. 6 is a side view of the food processor cover as shown in FIG. 1, wherein the feed tube lid is in an open position and the movable sleeve is in the pull-out position.

FIGS. 2 and 4 illustrate the movable sleeve 05 in a natural position, with the feed tube lid 04 in a closed position. FIG. 5 illustrates the movable sleeve 05 in a pull-out position, with the feed tube lid 04 in the closed position. FIG. 6 illustrates that when the feed tube lid 04 is in an open position, the movable sleeve 05 can move freely inside the feed tube lid 04 in the direction parallel to the central axis 14 of the feed tube lid 04. Some protruding members are disposed at the bottom surface of the lower limit ring 12 in order to increase the friction while compressing down on the food to ensure that the food can not slip away.

Figure 1:
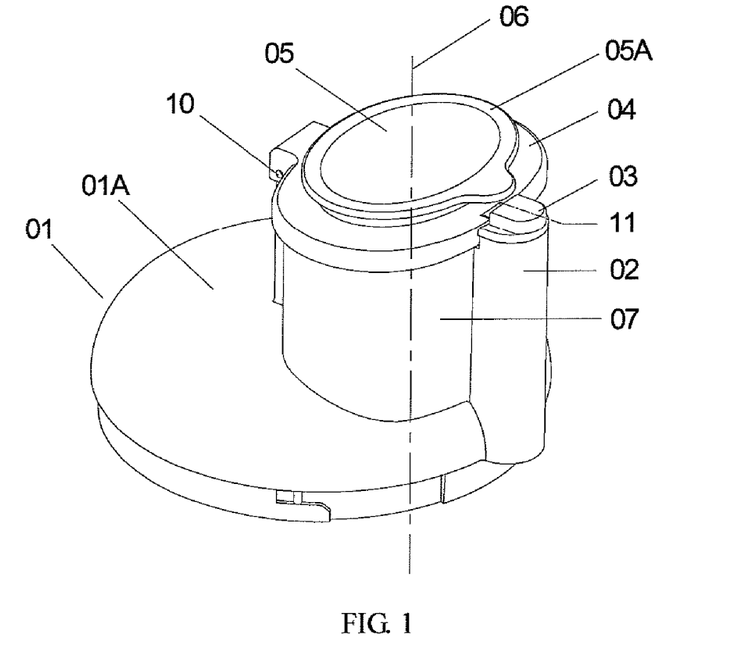
FIG. 1 is a front perspective view of the food processor cover with a feed tube and a feed tube lid assembly according to one embodiment of the present invention.
Figure 7:
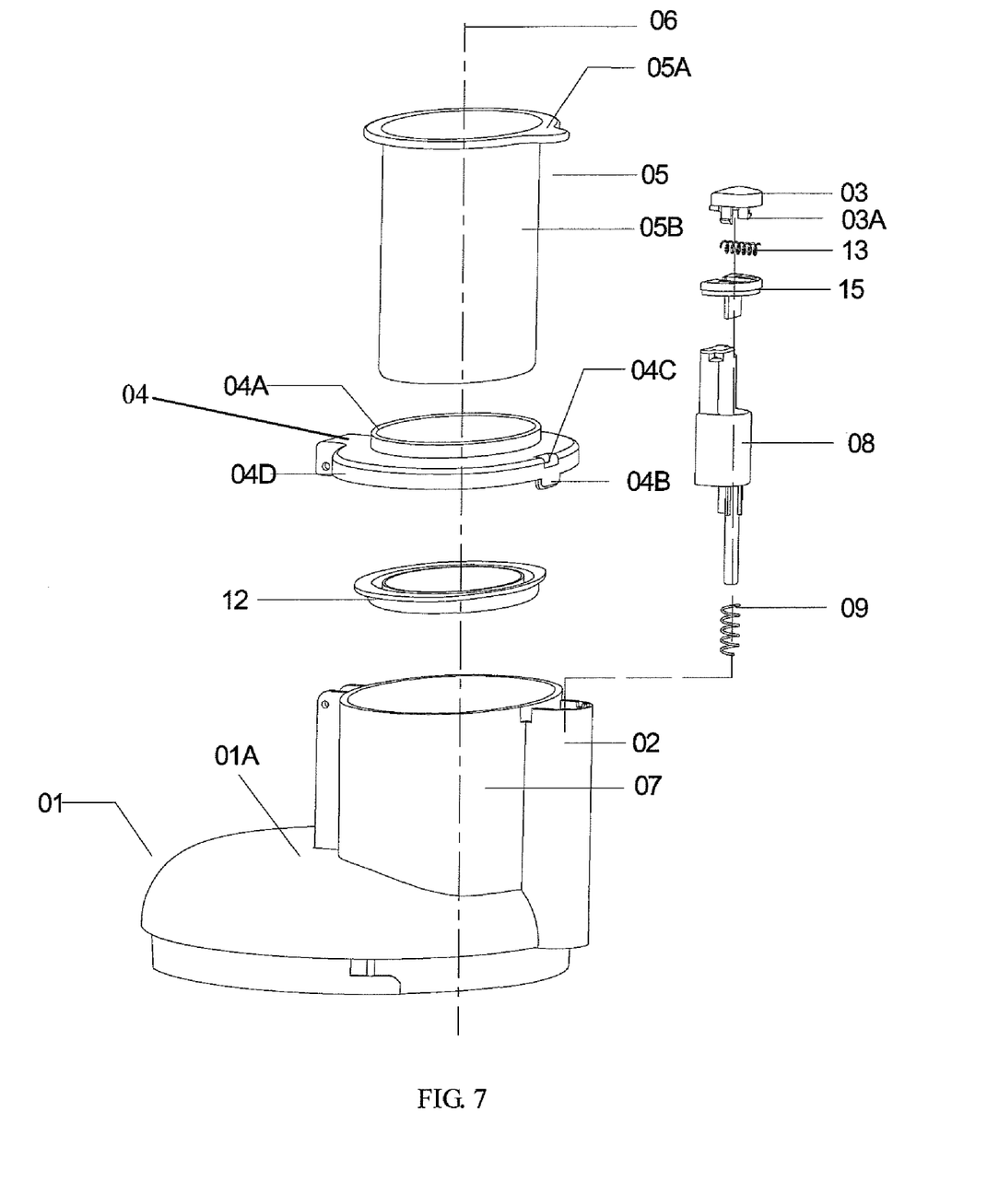
FIG. 7 is an exploded view of the food processor cover as shown in FIG. 1.

As shown in FIGS. 1, 2, and 7, the food compressor cover 01 has a locking device and a safety rod assembly. The locking device includes a press button 03 under which two lock pins 03A are disposed on the right and left sides, the two lock pins 03A and a press button spring 13 are both disposed on the rod upper end 15 on the top end of the boss 02. Thanks to the use of the two lock pins 03A, the press button 03 can not be pulled out after being pressed down but can move in the direction parallel to the horizontal central axis 11 of the rod upper end 15. The safety rod assembly includes an operating rod 08 and a stainless steel spring 09. The operating rod 08 is disposed inside the boss 02 and moves up and down inside the boss 02 in the direction parallel to the central axis 14 of the feed tube lid 04. The lower part of the operating rod 08 is formed into a cylinder onto which the stainless steel spring 09 is mounted so that the operating rod 08 can be urged to reset automatically without external forces. The rod upper end 15 is disposed on the top end of the boss 02 in an undetachable way, thereby the operating rod 08 is restricted to move within a sealed cavity.

The lid brim 04D under the feed tube lid 04 has a protruding member 04B positioned to correspond to the boss 02, and the protruding member 04B is provided for pressing down the operating rod 08 inside the boss 02 and making the operating rod 08 move downwardly in the direction parallel to the cover central axis 06. A square concave recess or indentation 04C is disposed in the lid brim 04D above the protruding member 04B for receiving the press button 03 in the locking position. When the press button 03 is locked into the square concave recess 04C automatically by means of a spring, the feed tube lid 04 is accordingly in the locking position. The feed tube lid 04 is pivotally mounted on the feed tube 07 of the cover 01 by means of two shafts around which the lid can rotate.

Figure 8:
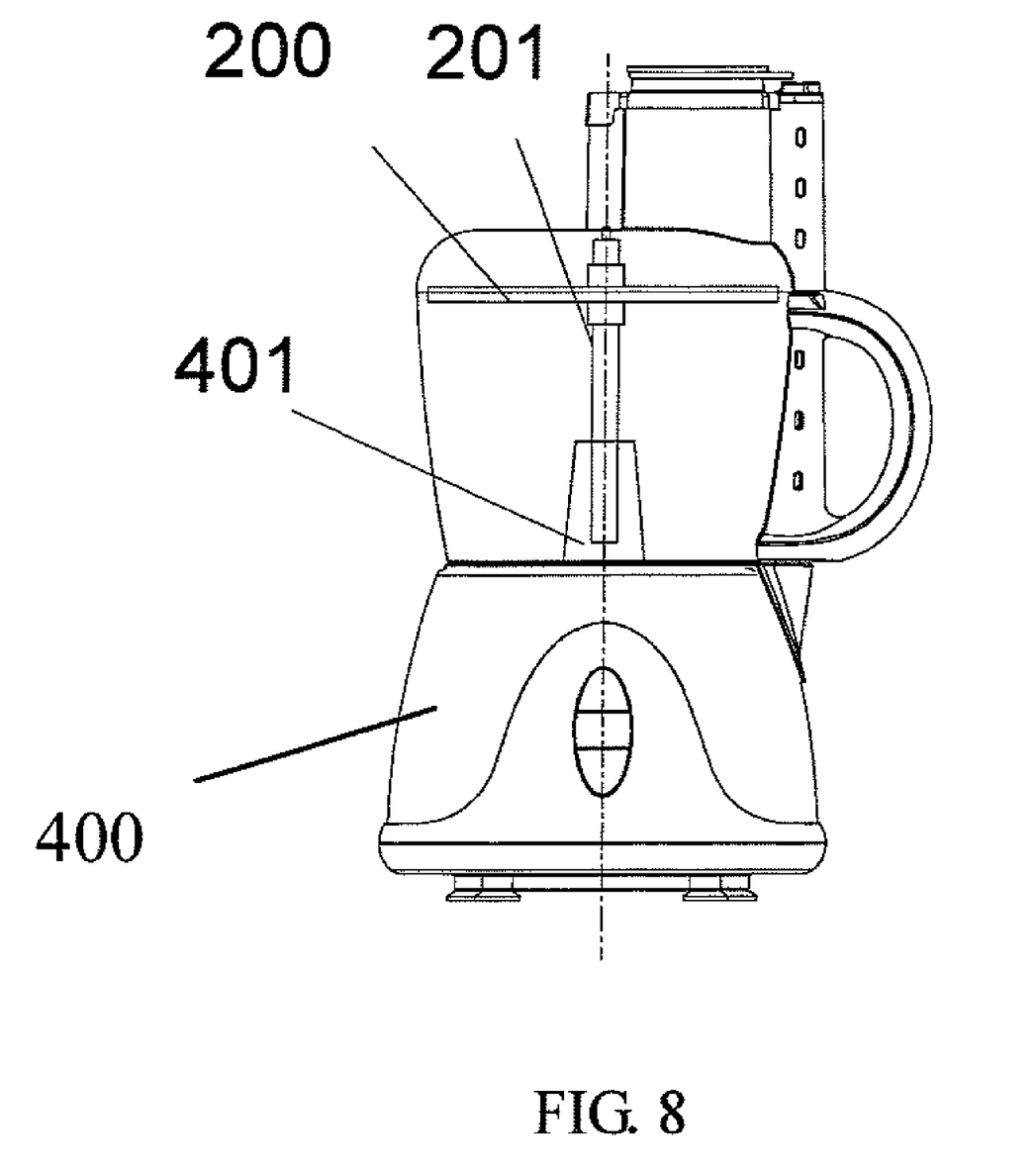
FIG. 8 is a front view of a food processor with the cover as shown in FIG. 1.
Figure 9:
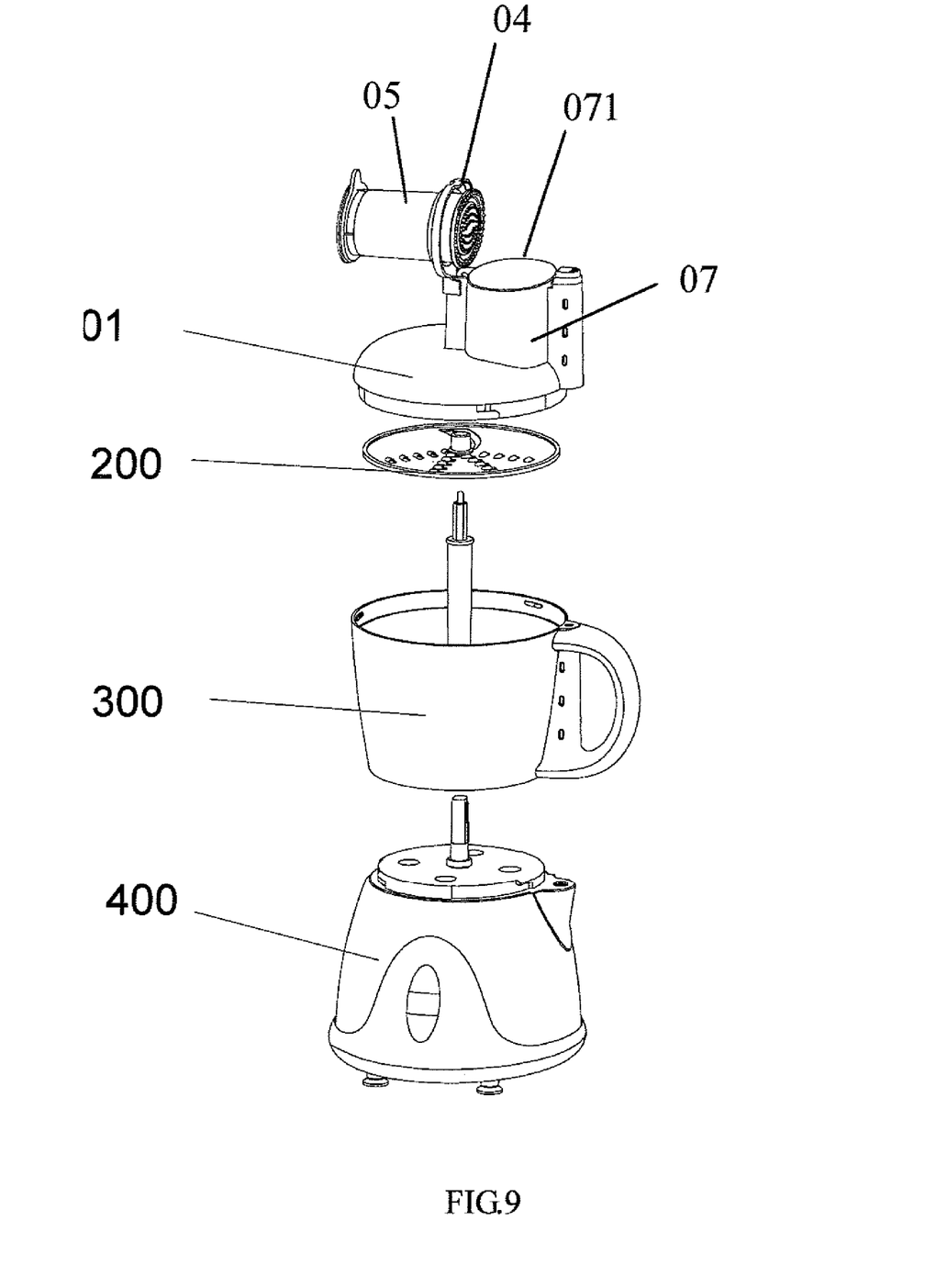
FIG. 9 is an exploded view of the food processor as shown in FIG. 8.

As shown in FIGS. 8 and 9, food processor of the present invention comprises: a cover 01 with a feed tube 07 which extends upwardly from an upper cover surface 01A, a rotating blade tool 200 including a rotating shaft, a working bowl 300 which is disposed under the cover 01 and to be used in combination with the cover 01, and a base housing 400 to support the working bowl 300 including a driving device therein with a shaft. A feed tube safety food entrance 071 is disposed at the top end of the feed tube 07, a driving device with a shaft 401 is disposed inside the base housing 400, the rotating shaft 201 of the rotating blade tool 200 disposed under the feed tube 07 inside the working bowl 300 is connected with the shaft 401 of the driving device. Accordingly, the feed tube safety food entrance 071 and the working bowl 300 are connected via the feed tube 07.

In a working state, the feed tube lid 04 covers the feed tube 07, whereby when the protruding member 04B is pressed down on the operating rod 08, the safety switch is actuated by the pressure from the working bowl rod, which is not shown in figures. In this condition, the movable sleeve 05 can move up and down (as shown in FIGS. 4 and 5) in the direction parallel to the cover central axis 06. With the help of the press button spring 13, the press button 03 is pressed onto the feed tube 07 and then the feed tube lid 04 is locked and fixed. When the feed tube lid 04 is opened (as shown in FIG. 6), the operating rod 08 can be urged upwardly to reset automatically by the elastic force from the rod spring 09 and then the working bowl rod (which is not shown in figures) resets accordingly to turn off the safety switch. When dealing with small sized food, the food can be put through directly from the food safety entrance 071 of the movable sleeve 05, then the food can be pushed and compressed by an additional food pusher which moves inside the feed tube 07 during the food processing; when dealing with the larger sized food, the movable sleeve 05 can be used as the food pusher to push and compress on food in food tube.

The food processor cover according to the present invention comprises (as shown in FIG. 7): the upper cover surface 01A, the feed tube lid 04, the movable sleeve 05, the lower limit ring 12 and the rod upper end 15. Normally they are made of SAN material, but the present invention is not restricted to SAN material and other materials may be used.

What is claimed is:

1. A food processor cover comprising:
an upper cover surface;
a feed tube which extends upwardly from the upper cover surface;
a safety rod assembly disposed on the outside of the feed tube, said safety rod assembly including an operating rod and a rod spring;
a feed tube lid assembly including a feed tube lid pivotally mounted on the feed tube, and a movable sleeve;
wherein said feed tube lid includes a through hole at an upper end thereof for receiving the movable sleeve inside the feed tube lid and enabling axial movements of the movable sleeve therein;
wherein each end of the movable sleeve includes a limiting device, and the top of said movable sleeve forms a safety food entrance defined by a major axis and a minor axis, with an average of the major and minor axes being less than 2.5 inches (63.5 mm) and the major axis being less than 3 inches (76.2 mm);
wherein said limiting device includes an upper limit ring and a lower limit ring respectively shaped in oval;
wherein said upper limit ring and lower limit ring are integrally fixed on said movable sleeve;
wherein the outer dimensions of the upper and lower limit rings are slightly larger than that of the through hole of the feed tube lid;
wherein at least one protruding member is disposed at a bottom surface of the lower limit ring;
wherein the periphery of said feed tube lid extends downwardly forming a lid brim with dimensions larger than that of the feed tube;
wherein an upward edge of the through hole of the feed tube lid forms an upward neck;
wherein said lid brim has a protruding member positioned to correspond with the operating rod; and
wherein a square concave recess is disposed in the lid brim above said protruding member; and
a locking device disposed on an upper end of said safety rod assembly;
whereby when the feed tube lid assembly is in a closed state, the feed tube lid covers the feed tube, and the protruding member of the feed tube lid presses down the operating rod; and when the feed tube lid assembly is in an open state, the operating rod is urged to reset by means of the rod spring.

2. The food processor cover according to claim 1, wherein the cross sections of the feed tube lid and the through hole are both in similar shapes selected from the group consisting of an oval and a circle, and said movable sleeve has a tubular structure formed by a thin wall whose cross section is in a shape selected from the group consisting of an oval and a circle.

3. The food processor cover according to claim 1, wherein said safety rod assembly includes a boss for holding the operating rod and a rod upper end; wherein said boss is integrated on an outside of the feet tube; and wherein said rod spring is mounted on the operating rod which is disposed inside the boss, and the rod upper end is positioned at the top end of the boss, so that said operating rod can move up and down inside the boss in the direction of the cover central axis.

4. The food processor cover according to claim 3, wherein a lower part of the operating rod is formed into a cylinder onto which said rod spring is mounted so that the operating rod can be urged to reset automatically without external forces.

5. The food processor cover according to claim 3, wherein said rod upper end is fixed on the top end of the boss forming a sealed cavity within the boss, whereby the operating rod is restricted to move within the sealed cavity of the boss.

6. The food processor cover according to claim 3, wherein said feed tube and the boss extend upwardly in the direction of the cover central axis; and wherein the cross section of said feed tube is in a shape selected from the group consisting of an oval and a circle.

7. The food processor cover according to claim 1, wherein said locking device includes:
   a press button which locks with the operating rod upper end by use of two lock pins which are disposed under the right and left sides of the press button;
   a press button spring disposed under the press button by which the press button can move relatively inside a boss in the direction vertically to the cover central axis; and
   wherein when the feed tube lid covers the feed tube, the press button is locked into a square concave recess formed in the feed tube.

8. A food processor comprising:
   a cover as claimed in claim 1,
   a rotating blade tool including a rotating shaft,
   a working bowl disposed under the cover and to be used in combination with the cover, and
   a base housing to support the working bowl including a driving device therein with a shaft;
   wherein the rotating shaft of the rotating blade tool is connected with the shaft of the driving device, which is disposed under the feed tube inside the working bowl; and
   wherein when the feed tube lid covers the feed tube, the operating rod is pressed down to actuate the driving device.

9. A food processor cover comprising:
   an upper cover surface;
   a feed tube which extends upwardly from the upper cover surface;
   a safety rod assembly including an operating rod, a rod spring and a boss for holding the operating rod and a rod upper end, wherein said boss is integrated on an outside of the feed tube, wherein said rod spring is mounted on the operating rod which is disposed inside the boss, and the rod upper end is positioned at the top end of the boss, so that said operating rod can move up and down inside the boss in the direction of the cover central axis;
   a feed tube lid assembly pivotally mounted on said feed tube, said feed tube lid assembly includes a safety food entrance defined by a major axis and a minor axis, with an average of the major and minor axes being less than 2.5 inches (63.5 mm) and the major axis being less than 3 inches (76.2 mm); and
   a locking device disposed on an upper end of said safety rod assembly, said locking device includes a press button and a press button spring, wherein said press button locks with the operating rod upper end by use of two lock pins which are disposed under the right and left sides of the press button, the press button spring is disposed under the press button by which the press button can move relatively inside the boss in the direction vertically to the cover central axis;
   whereby when the feed tube lid assembly is in a closed state, the feed tube lid covers the feed tube, the press button is locked into a square concave recess formed in the feed tube so as to compress down the operating rod, and when the feed tube lid assembly is in an open state, the operating rod is urged to reset by means of the rod spring.

10. A food processor comprising:
    a cover as claimed in claim 9,
    a rotating blade tool including a rotating shaft,
    a working bowl disposed under the cover and to be used in combination with the cover, and
    a base housing to support the working bowl including a driving device therein with a shaft;
    wherein the rotating shaft of the rotating blade tool is connected with the shaft of the driving device, which is disposed under the feed tube inside the working bowl; and
    wherein when the feed tube lid covers the feed tube, the operating rod is pressed down to actuate the driving device.

* * * * *